United States Patent

[11] 3,634,762

[72] Inventor Claude-Auguste Queron
 Seine, France
[21] Appl. No. 6,416
[22] Filed Jan. 28, 1970
[45] Patented Jan. 11, 1972
[73] Assignee Compagnie Des Compteurs
 Paris, France
[32] Priority Jan. 28, 1969
[33] France
[31] 6901613

[54] LOGICAL DEVICE FOR COMPARING THE PHASE SHIFT OF AN ELECTRICAL MAGNITUDE TO BE CHECKED IN RELATION TO A REFERENCE ELECTRICAL MAGNITUDE
 7 Claims, 10 Drawing Figs.
[52] U.S. Cl. .................................................... 324/83 D
[51] Int. Cl. ................................................... G01r 25/00

[50] Field of Search............................................ 324/83 A,
 83 D; 328/110, 133

[56] References Cited
UNITED STATES PATENTS
3,388,326 6/1968 Brooks .......................... 324/83 D
3,016,475 1/1962 Kirsten ......................... 324/83 D
3,271,675 9/1966 Kreinberg..................... 324/83 D Primary Examiner—Alfred E. Smith
Attorney—Pierce, Scheffler & Parker ABSTRACT: Phase comparing process and device in which the alternations of both a reference electric magnitude and an electric magnitude to be checked are converted into rectangular pulses, then the rectangular pulse corresponding to the magnitude to be checked is derivated, in order to determine whether or not there exists a time coincidence between said derivative and each rectangular signal corresponding to the reference electric magnitude.

LOGICAL DEVICE FOR COMPARING THE PHASE SHIFT OF AN ELECTRICAL MAGNITUDE TO BE CHECKED IN RELATION TO A REFERENCE ELECTRICAL MAGNITUDE

In numerous applications, for instance, in metering relays or any other phase selector devices, it is often necessary to know the vectorial position of an electric magnitude in relation to one or more reference electric magnitudes, and to locate automatically this vectorial position in a precisely defined displacement zone.

Also, in certain cases, it is useful to know permanently and with great accuracy, the phase displacement of an electric magnitude with respect to another one and in case to follow the phase displacement of the electric magnitude which is to be checked, for instance to enable the subsequent control of devices intended to bring said phase displacement within a given limit in relation to the phase of the reference magnitude.

The device of the invention comprises at least one converter forming rectangular pulses of the same width as one of the alternations of the reference electric magnitude, at least one converter forming rectangular pulses corresponding to one of the alternations of the electric magnitude to be checked, a derivating circuit connected to the converter of the electric magnitude to be checked and forming the derivative of the rectangular pulses coming from this converter, a coordination AND gate whose inputs are respectively connected to said converter of the reference electric magnitude and to the circuit of the pulses coming from the electric magnitude to be checked, and temporary memory means connected to the output of the AND gate and to the converter of the magnitude to be checked.

Various other characteristics of the invention are moreover revealed by the detailed description which follows.

Embodiments of the invention are shown by way of nonrestrictive example, in the accompanying drawings.

FIG. 1 represents a Fresnel's circle in which the vector $V_R$ represents a reference alternating voltage $V_R$ and $V_C$ shown by a solid line represents a voltage $V_C$ whose phase displacement is to be watched in relation to the position of the phase of the voltage $V_R$. In the case considered and according to the usual conventions the voltage $V_C$ lags with regard to the voltage $V_R$.

In the following disclosure, voltages only are dealt with, but it is quite obvious that there may be other electric magnitudes, and particularly currents whose phase displacement is to be determined or watched with regard to the phase of a reference current or of several reference currents.

Figure 1:
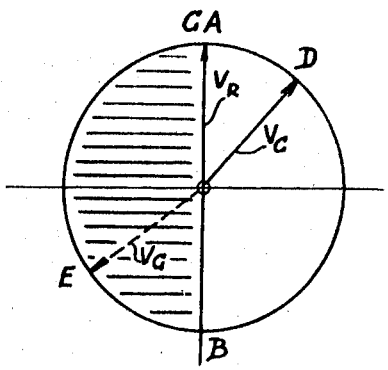
FIG. 1 is an explanatory Fresnel's diagram of the invention.

Referring again at FIG. 1 and in the simple case when there only exists a single reference voltage $V_R$, then it is advisable to ascertain whether the phase displacement of the voltage $V_C$ is lagging or leading, in relation to the phase of the voltage $V_R$ or, in other words, if the vector $V_C$ is in the circular sector ADB, as shown by a solid line, or on the contrary in the circular sector BEC as shown by a dotted line in the hachurated zone.

Figure 2:
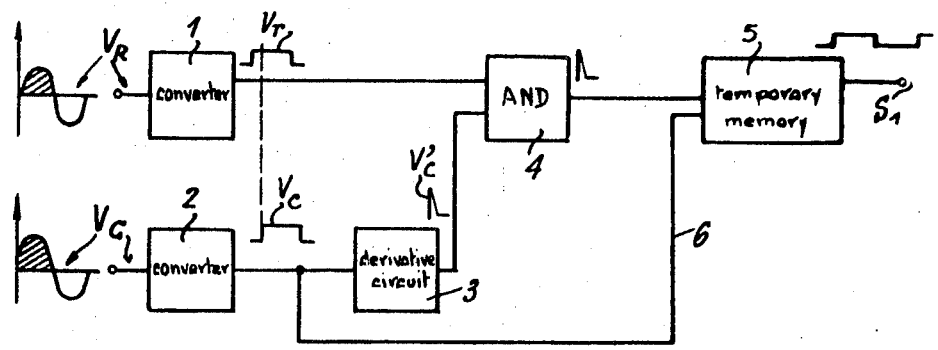
FIG. 2 is a logical diagram of an embodiment of the phase comparator device of the invention.

To know whether the vector $V_C$ is in one or the other of the above-mentioned sectors of the Fresnel's circle, and this by keeping a continual watch and detection in the time lag equal to a period of the alternating current or voltage, one proceeds as follows:

A shown on FIG. 2, one applies the voltages $V_R$ and $V_C$ to the input of converters 1 and 2, formed, par example, each one by a transistor of a thyristor controlled at the beginning of each alternation in order, as in the example considered in FIG. 2, to select only the positive alternations of the voltages $V_R$ and $V_C$ and to form, for each one of said positive alternations, a rectangular pulse $V_r$ of the same width as the alternation considered of the voltage $V_R$. This is shown by the first curve of FIG. 3, where the distance AB corresponding to the width of the pulse $V_r$ corresponds to the vector $V_R$ of FIG. 1, whereas the distance BC corresponds to the width of the negative pulse which is eliminated by the converter 1. In like manner, the converter 2 to which the voltage $V_C$ is applied, produces, for each positive alternation, a rectangular pulse $V_c$. This pulse is shown by the second curve of FIG. 3, which shows that this second pulse lags in relation to the pulse $V_r$.

Figure 3:
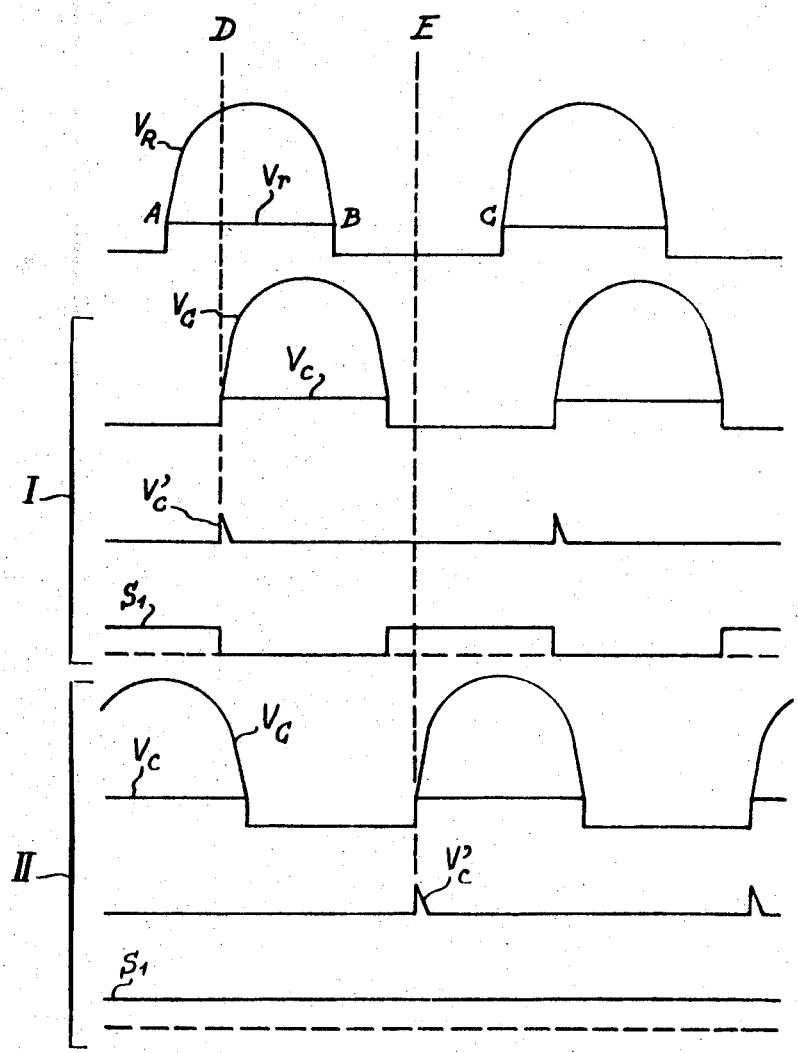
FIG. 3 is a set of explanatory curves for the working of the device of FIG. 2 with regard to the Fresnel's diagram of FIG. 1.

The pulses $V_c$ are successively applied to the input of a derivating circuit 3 which forms the derivative $V'_c$ of these pulses, i.e., as known in electricity, a short pulse which is shown on the third curve of FIG. 3, this short pulse being obviously formed at the same time that the pulse $V_c$ begins to occur. The output of derivating circuit 3, and the output of the converter 1, are connected to the inputs of a coincidence AND-gate 4, which itself is connected, by its output, to an input of a temporary memory 5, which can be made in numerous different ways, and, for instance, by a capacitance-resistance circuit associated with a Schmitt trigger. The memory 5 also receives at its input, the pulses $V_c$ which are applied to it by a conductor 6 connected to the output of the converter 2. For instance, the memory 5 is provided so that its output $S_1$ issues a continuous voltage or current signal of a given value when this memory does not receive any information from the AND gate and said memory is made, as is the case when it is formed by a resistance-capacitance circuit associated with a Schmitt trigger, so that the pulses $V_c$ that can be directly applied to it do not alter its state, hence do not alter the signal that it supplies at its output $S_1$, but on the other hand that it is in a position to change of state, and thus to modify the signal at its output $S_1$, if a pulse comes from the AND gate.

Considering again the example of FIG. 1, corresponding to the set of curves of the bracket I of FIG. 3, in relation with the curve $V_R$ of the reference voltage, one sees that at the moment when the pulse $V_c$ is formed, the derivating circuit 3 produces the pulse $V'_c$ which is applied to one of the two inputs of the AND-gate 4. Moreover, the reference pulse $V_r$ is applied to the other input of the AND gate which is thus open, and consequently, the pulse $V'_c$ is applied to the input of the memory 5 which rocks, so that the continuous signal which was coming from it is cancelled, as shown at $S_1$ on the last curve of the set of curves of the bracket I of FIG. 3. This new state of the memory 5, remains as long as the pulse $V_c$ is applied, upon which the memory 5 resumes its initial state and thus supplies again the signal of the predetermined value. The pulse $V_c$ is thus used as a time base.

Therefore, the same working operations are renewed at each repetition of the pulses $V_r$ and $V_c$ if the phase displacement of the voltage $V_C$ does not vary in relation to the phase of the reference voltage $V_R$. Consequently, this displacement is checked at each period.

FIG. 3 shows that the working conditions described above are identically repeated provided there is a time coincidence between the pulses $V_r$ and $V_c$, i.e., provided the derivative pulse $V'_c$ is produced during the time of the reference pulse $V_r$, which is shown by the dotted line D. The position of this straight line D corresponds to the measure of the phase lag of the voltage $V_c$ in relation to the phase of the reference voltage $V_r$ and hence to the arc AD of FIG. 1.

Seeing that it has been shown that the working conditions of the memory 5, i.e., in a still more simple way than the conditions for which the AND gate can be open, are identically reproduced, provided there is a coincidence between the pulse $V_r$ and the derivative pulse $V'_c$, then the arc AD may be of any kind but comprised in the arc AB of FIG. 1.

If one now considers the set of curves of the bracket II of FIG. 3, still in relation to the reference voltage $V_R$, one sees that the voltage $V_C$ is lagging for more than 180° in relation to said reference voltage $V_R$, or else, on the other hand, that it is leading for less than 180°. In this case, as shown by the straight dotted line E, there is no longer any coincidence between the pulse $V_r$ and the derivative pulse $V'_c$. Consequently, one of the inputs of the AND-gate 4 is open as long as the pulse $V_r$ lasts, but the other input is not open during this time, so that said AND gate is never open. It follows that the pulse $V_c$, when it occurs, is properly applied to the temporary memory 5, but the state of said memory is not modified, and consequently the signal at its output $S_1$ is a continuous signal. In this case, one is thus assured that the vector $V_C$ in dotted line in FIG. 1 is in the sector BEC at any of the points thereof, because these latter working conditions remain as long as there is no coincidence between the derivative signal $V'_c$ and the reference pulse $V_r$.

If, for any reason, the phase displacement of the voltage $V_C$ varies abruptly and passes from one to the other of the two zones of the Fresnel's circle of FIG. 1, then this is determined in a time at the most equal to one period, simply by watching the output signal of the memory 5, signal which can be used for operating a protection device, for instance. It is obvious that the memory 5 can, if so required, be suppressed, the essential point being to ascertain whether there is, or not, a signal at the output of the AND gate, seeing that it is the existence of this signal which informs whether the vector $V_C$ is on one side or the other of the reference vector $V_R$.

In some cases, it may be useful to determine again more quickly a phase displacement of an electric magnitude in relation to a reference magnitude, and to obtain continuous signals which are characteristic of overstepping a displacement threshold.

Figure 4:
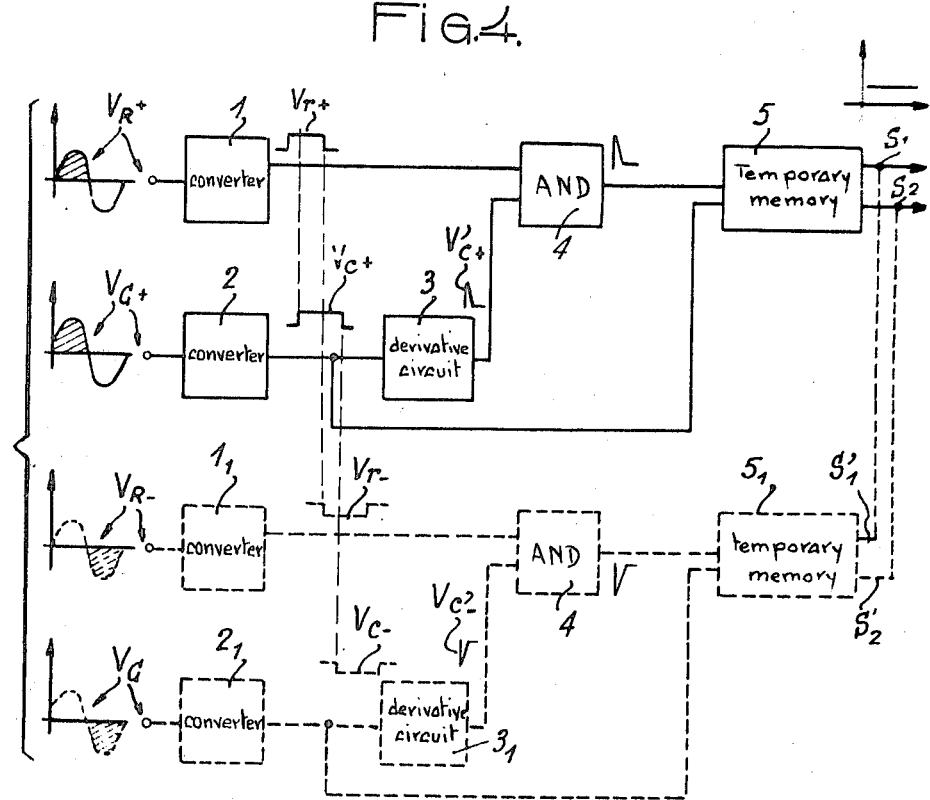
FIG. 4 is a diagram of a logical circuit showing a development of the circuit of FIG. 2.

FIG. 4 shows how an embodiment of the invention enables to check at each alternation a phase displacement, at the same time as continuous signals of different levels are produced for two characteristic phase displacement conditions. In this embodiment, one simultaneously uses positive and negative alternations. To this end, the device firstly comprises the same means as those above described with reference to FIG. 2, these same means being shown by a solid line and given the same references. Furthermore, a new identical unit is provided, but whose converters $1_1$ and $2_1$, which also respectively receive the reference voltage $V_R$ and the voltage $V_C$ to be checked, are provided for respectively forming pulses in dependency on the negative alternations of the voltages $V_R$ and $V_C$. For this reason, in FIG. 4 the different references are shown with signs + and −.

The unit receiving the alternations $V_R$+ and $V_C$+, works exactly as previously described with reference to FIG. 2, the other unit receiving the alternations $V_R I$ and $V_C$− works, of course, in a similar manner, and consequently, the signals produced when there is a coincidence between the pulses $V_r$ and the derivative pulses $V'_c$ are respectively those of the bracket I of FIG. 3. However, seeing that the negative alternations are also analyzed, then by connecting the outputs $S_1$ and $S'1$ of the memories 5 and $5_1$, there is obtained a continuous signal instead of a discontinuous one. If the phase displacement between the voltages $V_R$ and $V_C$ varies abruptly, this is detected either by the unit analyzing the alternations +, or by the unit analyzing the alternations −, so that the detection is then estimated in a time at the most equal to a half-period. This also applies if the working is that explained in relation to the bracket II of FIG. 3, but the signal level is then different. By providing the memories 5 and $5_1$ with two outputs $S_1$, $S_2$ and $S'_1$, $S'2$ respectively, and in connecting these outputs between them, one permanently obtains two distant logical data permitting, for the same reasons, the ascertainment that the phase of the voltage $V_C$ is shifted in front or behind in relation to the phase of the reference voltage $V_R$.

Figure 5:
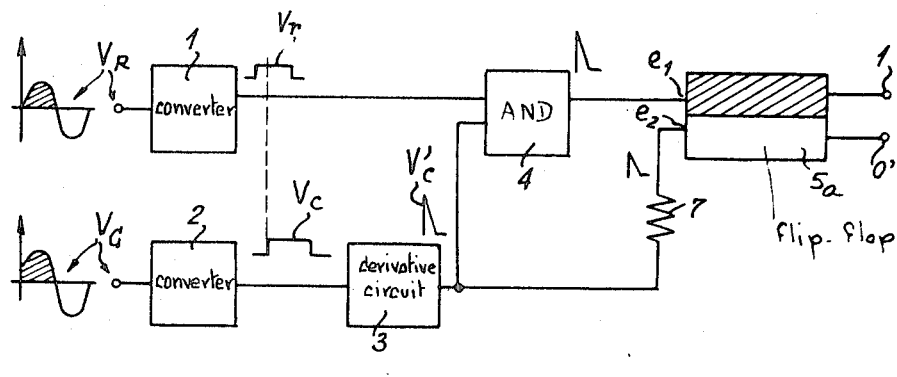
FIG. 5 is a diagram of a logical circuit showing a slight alternative as compared with FIG. 2.

FIG. 5 shows an alternative logical diagram of FIG. 2, this alternative enabling the memory to be used as a single flip-flop 5a. In this case, the AND-gate 4 is connected, by its output, to one of the inputs $e_1$ of the flip-flop 5a, whereas the output of the derivating circuit 3 forming the derivative $V'_c$ is connected, on the one hand, to one of the inputs of the AND-gate 4, and on the other hand, to the other input $e_2$ of the flip-flop 5a by means of a resistance 7 or other attenuating member eventually associated with an inverter circuit. In this embodiment, it is no longer necessary to connect the output of the converter 2 to the memory, as was the case in FIG. 2. When there is a coincidence between the pulses $V_r$ and the derivative pulses $V'c$, then, as in the preceding examples, the AND-gate 4 is open and a pulse is applied to the input $e_1$ of the flip-flop 5a. The derivative pulse $V'c$ is also applied to the second input $e_2$ of the flip-flop 5a at the same time as the pulse coming from the AND gate, but the level of this pulse is lower, seeing that it is applied across the resistance 7. In this way, the flip-flop 5a is made active on its hachured side and one obtains, at the outputs of said flip-flop, the logical states 1 and 0 which give knowledge of the state of the above-mentioned coincidence, hence that the vector $V_C$ of FIG. 1 is in the sector AB. One therefore sees that for each positive alternation, there is a confirmation of the order on the input $e_1$ of the flip-flop 5a. If, at a given moment, the phase displacement of the voltage $V_C$ means that the vector representing this voltage goes in the sector BC of FIG. 1, which corresponds to the case of the set of curves of the bracket II of FIG. 3 then the AND gate cannot be open, and consequently, no order confirmation pulse is applied at the input $e_1$ of the flip-flop. Consequently, the derivative pulse $V'_c$ is applied to the input $e_2$, and the logical state at the output of said flip-flop change abruptly.

Figure 6:
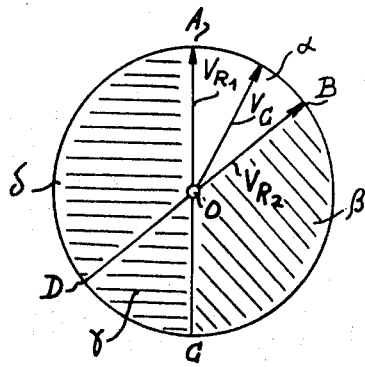
FIG. 6 is a Fresnel's diagram similar to FIG. 1, but showing an additional development of the invention.
Figure 7:
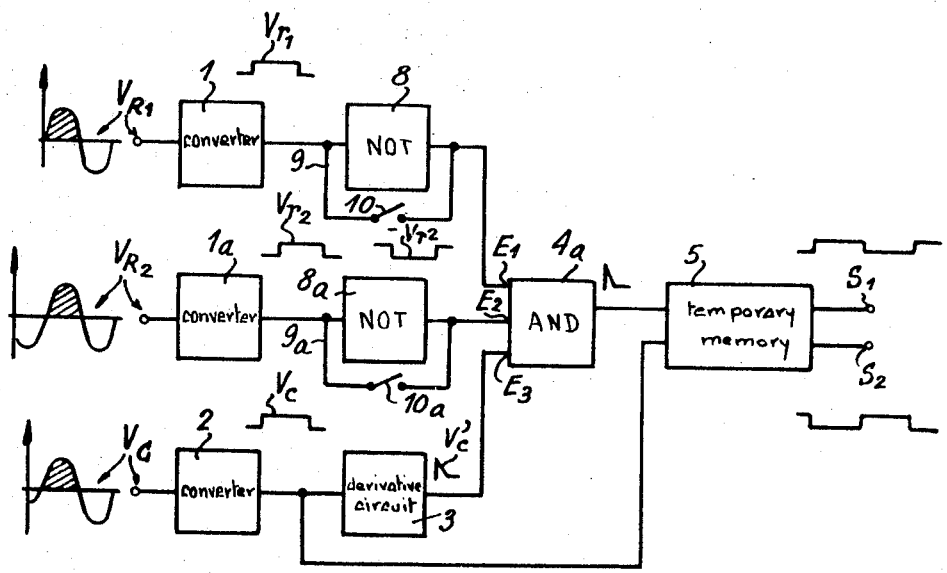
FIG. 7 is a diagram of a logical circuit showing the embodiment of the device embodying the characteristics arising out of FIG. 6.

In some cases, it is advisable, and even necessary, to know with accuracy the phase displacement of an electric magnitude or else to locate said displacement in any number of sectors of the Fresnel's circle. To illustrate what follows, FIG. 6 shows a Fresnel's circle similar to FIG. 1, but on which there are four sectors $\alpha, \beta, \gamma, \delta$, in one of which must be determined where is the vector $V_C$. To do this, as shown in FIG. 7, one uses two reference voltages $V_{R1}$ and $V_{R2}$ which are applied like the voltage $V_C$ to be checked, as in the preceding examples, to converters 1 for the voltage $V_{R1}$, 1a for the voltage $V_{R2}$ and 2 for the voltage $V_C$. The converters 1, 1a are connected to a AND-gate 4a by means of NOT-gates 8, 8a which can be short circuited by means of derivating circuits 9, 9a provided with switches 10, 10a.

As in FIG. 2, the converter 2 receiving the voltage $V_C$ to be checked, is connected to a derivating circuit 3 forming the derivative $V'_c$, this derivative circuit being itself connected to a third input E3 of the AND-gate 4a whose output is connected to one of the inputs of the memory 5. Also, as in FIG. 2, the second input of the memory 5 is connected to the output of the converter 2 receiving the voltage $V_C$.

Figure 8:
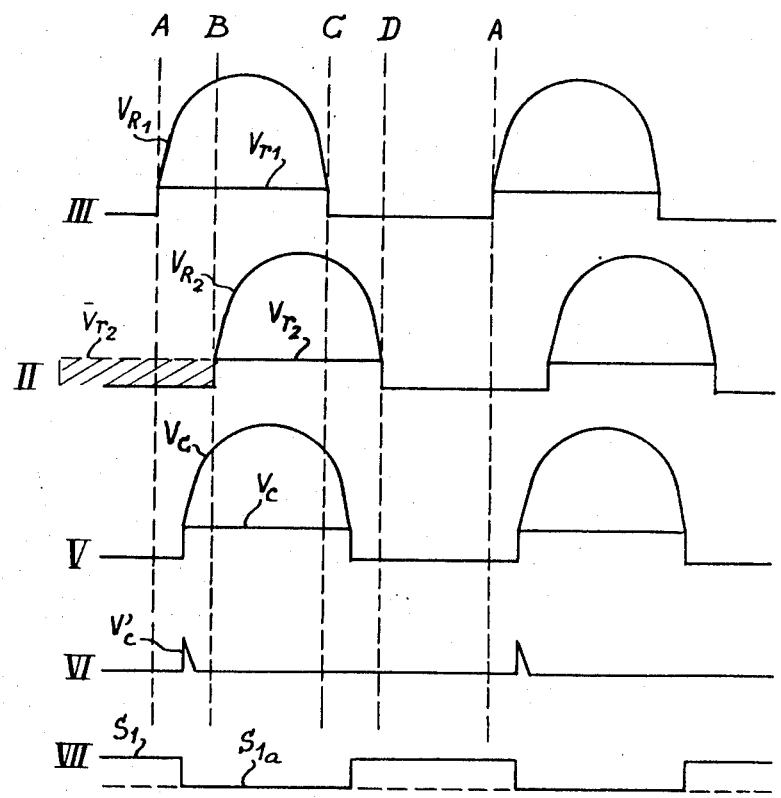
FIG. 8 is a set of curves showing the working of the logical circuit of FIG. 7 with regard to the Fresnel's diagram of FIG. 6.

For clearly understanding the working of the device according to FIG. 7, and taking as an example that the vector $V_C$ is in the sector $\alpha$ (FIG. 6) it is firstly necessary to refer to FIG. 8 in which there is shown at III the reference voltage $V_{R1}$, at IV the reference voltage $V_{R2}$, at V the voltage to be checked $V_c$, at VI the derivative pulses $V'c$ coming from the derivating circuit 3, and at VII the signals supplied by the output $S_1$ of the memory 5.

In the first place, one sees that the converters 1, 1a and 2, respectively supply the rectangular pulses $V_{r1}$, $V_{r2}$ and $V_c$. If one considers that the voltage $V_{R1}$ is taken as original voltage and that the voltage $V_{R2}$ is taken to be the limit voltage according to the Fresnel's diagram of FIG. 6, then it is necessary that the phase displacement of the voltage $V_C$ be comprised between the phase of the voltage $V_{p1}$, and the phase of the voltage $V_{R2}$, to find itself in the sector $\alpha$, i.e., between the limits A and B appearing both in FIG. 6 as well as in FIG. 8.

For verifying this working condition and taking into account what was explained in the foregoing, it is obviously necessary to obtain a state of coincidence so that the two inputs $E_1$ and $E_2$ of the AND-gate $4a$ are open.

If the NOT-gates 8 and $8a$ are not taken into account, FIG. 8 shows that it is not possible to obtain this condition, because the reference vector $V_{R2}$ is, in the example chosen, necessarily shifted more to the rear than the vector $V_C$, thereby showing the phase displacement to the rear of the voltage to be checked, in relation to the original voltage $V_{R1}$. Nevertheless, the device of FIG. 7, providing a NOT gate interposed between the AND gate and each of the converters 1 and $1a$, one sees that when closing the switch 10 of the derivating circuit 9, the NOT-gate 8, is isolated, i.e., that the pulse $V_{r1}$ is obtained for the input $E_1$ of the AND gate, and that on the contrary, by keeping the switch $10a$ open of the derivating circuit $9a$, there is obtained, on the input $E_2$, a complementary logical pulse $V_{r2}$ which appears in FIG. 7, as well as in mixed lines on the curve IV of FIG. 8, which, by this artifice, permits the opening of the input $E_2$ of the AND-gate gate $4a$.

In these conditions, the beginning of the pulse $V_c$ is seen giving rise to the derivative $V'_c$ which opens the third input $E_3$ of the AND-gate $4a$; this gate thus becomes passing, and, for the reasons explained in the foregoing, the memory 5 changes its state and shows, at its output $S_1$, during the entire time of the pulse $V_c$, the characteristic signal $S_{1a}$.

The precedings may be put down in a simple manner in binary notation. Actually, for all the values of the phase displacement of the vector $V_C$ in the sector $\alpha$, the following relation must be effected, namely $$V_{R1} \cdot V_{R2}$$

in which $\overline{V}$ shows that use is made of the NOT-gate $8a$. By utilizing the same binary notation, if it is desired to watch the phase displacement of the vector $V_c$ in the sector $\beta$, the following relation must be effected:

$$V_{R1} \cdot V_{R2}$$

i.e., that the NOT-gates 8 and $8a$ are both short circuited by closing the switches 10 and $10a$. This case can be verified by referring to FIG. 8 which clearly shows that in the space separating the dotted lines B and C, pulses $V_{r1}$ and $V_{r2}$ are superimposed.

In like manner, with regard to the sector $\gamma$, for verifying that the vector $V_C$ is in said sector $\gamma$, the following relation must be effected $$\overline{V}_{R1} \cdot V_{R2}$$

In other words, in this case, the NOT-gate 8 is used and the NOT-gate $8a$ is short circuited.

Finally, with regard to the sector $\delta$, it is necessary to satisfy the relation:

$$\overline{V}_{R1} \cdot \overline{V}_{R2}$$

which means that in this case, the two NOT-gates 8 and $8a$ are kept in the circuit.

In the example of FIG. 7, the memory 5 is shown with two outputs $S_1$ and $S_2$, these two outputs obviously giving signals which are complementary between them and which are the image, during each period, of the sector in which the sector $V_C$ is, in relation to the reference vectors $V_{R1}$ and $V_{R2}$ taking into account the choice made of one or other of the sectors by putting into circuit, or on the contrary, out of circuit, one and/or the other of the NOT-gates 8 and $8a$. Actually, it has just been explained that by putting the gate 8 out of circuit, one checks, at each period, that the vector $V_C$ is in the sector $\alpha$, that by putting the two gates 8 and $8a$ out of circuit, one checks that the vector $V_C$ is in the sector $\beta$, by putting the gate $8a$ out of circuit, one checks the sector $\gamma$ and by putting the gates 8 and $8a$ out of circuit, one checks the sector $\delta$.

As a consequence, when the position of the vector $V_C$ is entirely unknown, it is easily possible to make a successive search of the various sectors by operating the switches 10 and $10a$.

Figure 9:
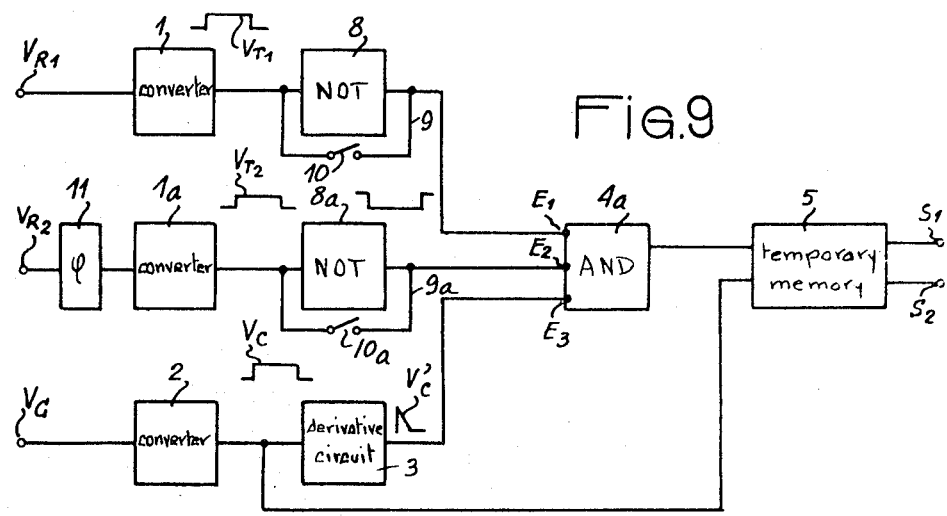
FIGS. 9 and 10 are diagrams of logical circuits showing two developments of the circuit of FIG. 7.

FIG. 9 shows an amplified development of the device with two reference voltages shown FIG. 7, this development making possible to adjust the arc of the sector, sector $\alpha$ for instance, defining two phase displacement thresholds which must not be passed in one direction or the other by the vector $V_c$ representing the voltage to be checked. This development of the invention uses exactly the same means as those of FIG. 7, which have consequently the same reference numbers. In addition, there is introduced upstream, for example, of the converter $1a$, a calibrated phase displacement circuit 11 (shown as $\phi$). By this means, and referring, for instance, to FIG. 6, the reference voltage $V_{R1}$ being taken as the origin, and the phase of the reference voltage $V_{R2}$ being able to be regulated at will by the phase displacement circuit 11, it thus becomes possible to approach or remove the vector $V_{R2}$ from the vector $V_{R1}$ in order to give to the arc AB the required opening, which, if so desired, can be very small. It is obvious that a similar phase displacement circuit can also be mounted upstream of the converter 1. By knowing exactly the value of the phase displacement of one or other of the vectors $V_{R1}$ or $V_{R2}$, it then becomes possible to know with accuracy and eventually even to follow, the phase displacement of the vector $V_C$ by only verifying that the AND-gate $4a$ is open, or on the contrary, closed at each period, or even if so required, at each half-period.

Figure 10:
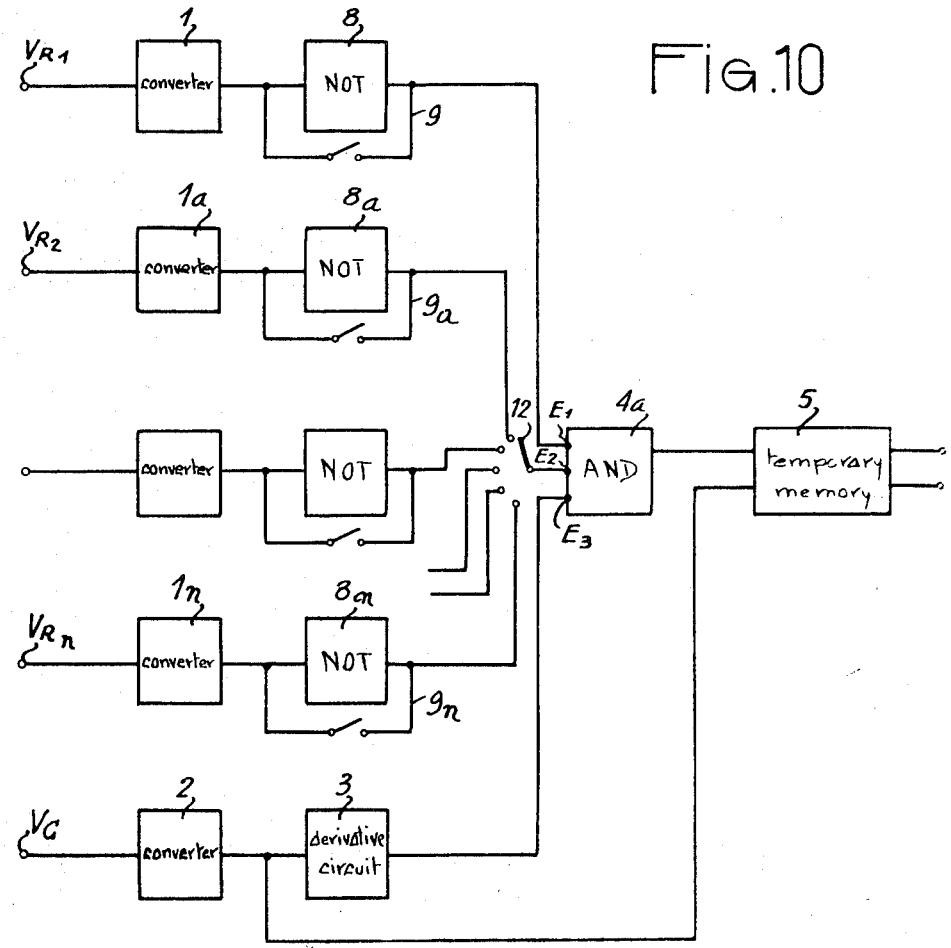

Another development also appears in FIG. 10 which shows that more than two reference voltages can be used. Actually, as shown in said Figure, reference voltages $V_{R1}, V_{R2} \ldots V_{Rn}$ can be applied to converters $1, 1a \ldots 1n$ each connected to a NOT-gate $8, 8a \ldots 8n$, whereas the voltage $V_C$ is applied to the converter 2. Although different circuits can be considered, it is often advantageous, as shown by the drawing, to consider the voltage $V_{R1}$ as an original voltage, and consequently, the NOT-gate 8 is connected directly to one of the inputs $E_1$ of the AND-gate $4a$, of which the other input $E_2$ can be selectively connected, by a switch 12, to the NOT-gates $8a \ldots 8n$, the third input $E_3$ of said gate $4a$ being connected to the derivating circuit 3. The NOT gates belonging to the various reference voltages, are also provided with their derivative circuits $9, 9a \ldots 9n$.

By means of this embodiment and, as shown by the preceding explanations, it is possible to multiply the number of sectors $\alpha$ $\beta \ldots$ of the Fresnel's circle as much as desired and, by acting on the switch 12 it is possible to choose the position of the reference vector $V_{R2}$, defining, with the original reference vector $V_{R1}$, a sector with the desired angular opening. If so required, by acting on the switch 12 on the one hand, and on the other hand on the switches $10, 10a \ldots 10n$ in a sequential manner, it becomes possible to scan the whole of the Fresnel's circle.

I claim:

1. A logical device for comparing the phase-shift of an electric magnitude to be checked in relation to at least one reference electric magnitude, both said electric magnitudes having same frequency, wherein said device comprises a first converter connected to the electric magnitude to be checked and forming therefrom rectangular pulses of a same width as one alternation thereof;

at least one second converter connected to the reference electric magnitude and forming therefrom rectangular pulses of a same width as one alternation thereof;

a derivating circuit connected to the first converter and forming the derivative of the rectangular pulses from the electric magnitude to be checked:

a coincidence AND gate having at least one set of at least two inputs, said two inputs being respectively connected to said at least one second converter and to the derivating circuit;

a temporary memory having two complementary outputs and at least one set of at least two inputs, one of said two inputs being connected to the output of the coincidence AND gate to be controlled thereby, the other one input of said two input temporary memory being connected to the output of the first converter; whereby the rectangular pulse signal coming from said first converter is controlled by a signal coming from the coincidence AND gate, so that the position of the electric magnitude to be checked is known with respect to the position of the at least one reference magnitude.

2. A device according to claim 1 characterized in that the temporary memory is made in the form of a resistance-capacitance circuit associated with a two-input Schmitt trigger, of which one input is connected to the output of the converter connected to the electric magnitude to be checked, so that the rectangular pulses coming from this converter are used both for the unlocking of said trigger and as a time base for it, and the other one of the two inputs of said trigger being connected to said AND gate, whereby the output of said trigger supplies a continuous signal when the derivative of the signal coming from the electric magnitude to be checked does not coincide with the pulse coming from the reference electric magnitude, and that said output of the trigger supplies a periodical signal, of the same frequency as said electric magnitudes when the derivative coming from the magnitude to be checked coincides in time with a pulse coming from the reference magnitude and makes said AND gate, gate passing.

3. A device according to claim 1, characterized in that the temporary memory is formed by a two-input bistable flip-flop of which one input is connected to the output of the AND gate and of which the other input is connected, by an attenuating member, to the output of the derivating circuit, whereby said bistable flip-flop is kept in a same logical state as long as the derivative coming from the magnitude to be checked is in coincidence with the pulse coming from the reference magnitude and that said flip-flop is brought into the other logical state when there is no more this state of coincidence and that the signal coming from the derivative circuit is applied to it.

4. A device according to claim 1, wherein the first converter and the at least one second converter have each one two inputs respectively tuned on the positive alternations and on the negative alternations of the electric magnitude to which they are connected; and wherein the coincidence AND gate and the memory means each has a first and a second sets of at least two inputs, said first and second sets being respectively related to said positive and negative alternations.

5. A device according to claim 1, characterized in that it comprises at least two converters respectively connected to a reference electric magnitude and said converters are each connected to an input of a three-input coincidence gate, by means of NOT gate associated to the derivating circuits, the third input of said coincidence gate being connected to the output of the derivating circuit connected to the converter, to which is applied the electric magnitude to be checked, whereby said converters receiving the reference electric magnitudes form two trains of rectangular pulses, phase shifted in relation to one another by a known extent, thus defining, in a Fresnel's diagram, four distinct sectors, the situation of the vector corresponding to the dephasing of the magnitude to be checked being determined by the opening of the coincidence gate and the putting into or out of circuit of said NOT gates interposed between said coincidence gate and said converters corresponding to said reference magnitudes.

6. A device according to claim 1, characterized in that a calibrated dephasing circuit is placed upstream of at least one of the converters corresponding to the reference magnitudes, so that the sectors defined by the representative vectors of the respective phases of said reference magnitudes are adjustable in the Fresnel's diagram for modifying the arc of said sectors in one direction or the other.

7. A device according to claim 5, characterized in that it comprises more than two converters respectively connected to a reference electric magnitude, said converters associated with their NOT gates being connected to the coinciding AND gates by a selector switch.

* * * * *

UNITED STATES PATENT OFFICE
CERTIFICATE OF CORRECTION

Patent No. 3,634,762          Dated January 11, 1972

Inventor(s) CLAUDE AUGUSTE QUERON

It is certified that error appears in the above-identified patent and that said Letters Patent are hereby corrected as shown below:

In the Specification:

Col. 4, line 49, "derivating" should be

-- shunting --

Col. 5, lines 13 and 16, "derivating" should be

-- shunting --

Col. 6, line 37, "derivating" should be

-- shunting --

In the Claims:

Col. 7, line 20, ", gate" should be cancelled

Col. 8, line 9, "gate associated to the derivating circuits" should be

-- gates having shunting circuits associated therewith --

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents